Patented May 29, 1934

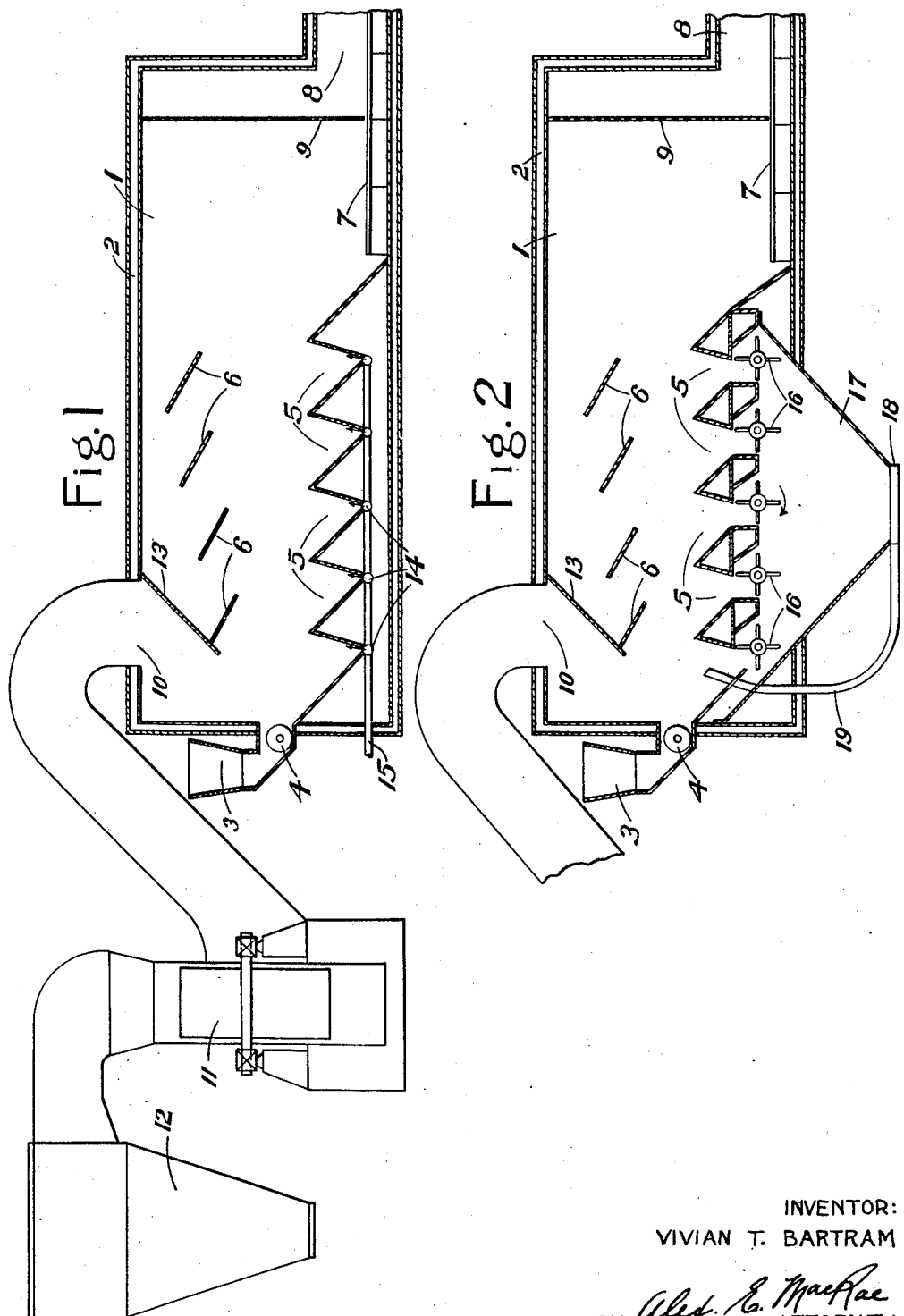

1,960,616

UNITED STATES PATENT OFFICE 1,960,616

PROCESS AND APPARATUS FOR DRYING GRANULAR OR LIKE MATERIAL

Vivian Turnill Bartram, Toronto, Ontario, Canada, assignor to Metallics and Non-Metallics Limited, Toronto, Ontario, Canada Application March 21, 1933, Serial No. 661,880

5 Claims. (Cl. 34—24)

This invention relates to a process and apparatus for drying granular or like material and more particularly for drying or dehydrating Glauber salts.

The object of the invention is to provide a simple process and apparatus whereby such materials may be economically dried. In accordance with the invention the granular or grain-size material is repeatedly thrown upwardly into a moving current of drying air or gas which travels in countercurrent to the material whose forward movement is directed by appropriately disposed baffles and hoppers.

The invention will now be described with reference to the accompanying drawing which illustrates more or less diagrammatically, convenient means for carrying out the invention, and in which,—

Figure 1 is a sectional elevation of a suitable apparatus, and

Figure 2 is a sectional elevation of a modified form of apparatus.

In the drawing, 1 is a drying chamber preferably insulated by an air space 2 or other desired means. 3 is a bin or hopper for the material to be dried, from which the material is fed into the drying chamber at a controlled rate by a feed screw 4 or the like. Adjacent the bottom of the drying chamber are placed a plurality of trough-shaped hoppers 5, the feed screw 4 discharging into the first of these. Above these hoppers and parallel therewith are a plurality of inclined baffles 6 arranged in staggered relation as shown. 7 represents a discharge means for the dry material, such as an automatic rake, travelling belt conveyor or the like. Dry air or gas which may or may not be heated is admitted through the opening 8 and is directed by the perforated baffle 9. The outlet 10 is connected to a fan 11 which discharges into a dust separator 12. A baffle 13 guards the outlet 10 and directs the flow of air or gas.

In the bottom of the trough-like hoppers are placed means for ejecting the material upwardly from each hopper into the drying atmosphere of the chamber. As shown in Figure 1, these means consist of perforated pipes 14 connected to a source 15 of air under pressure. As illustrated in Figure 2, these means consist of propellers or agitators 16 rotated rapidly in the direction of the arrow by any suitable means, not shown. Beneath these propellers is located a hopper 17 which collects any material which may escape through the propeller and this material is transferred back to the drying chamber by means of air under pressure supplied by a pipe 18 and conveyed with the material through the conduit 19.

In the operation of the process, material to be dried is continuously fed in a thin stream to the first of the hoppers 5 while the current of drying air or gas is admitted at 8. The material is thrown upwardly out of the hopper and is thus suspended in the drying zone. If it is desired to break up the material, the pressure of the air from the pipes 14 or the rate of rotation of the propellers will be such as to cause the particles to strike the directing baffles 6 with sufficient force to break the particles or masses of particles. With such material as Glauber salts this may be used with advantage in increasing the rate of drying. Striking the baffles the material will be directed forwardly into the next hopper from which it will be again thrown upwardly into suspension in the drying current, which is continuously changing under the influence of the fan 11. The action of the suspending air or propellers repeatedly agitates the mass of the material and assists in maintaining uniformity in the drying action. The repeated rise and fall of the material continues until the material reaches the discharge end of the drying chamber where it is removed by the discharge device 7. In passing through the discharge end of the chamber the dried or partially dried material is in contact with the fresh dry air which exerts a maximum drying influence.

The outward flow of the drying current is directed by the baffle 13 and thus it passes through the relatively wet material suspended from the first hopper. This assists in removing from the drying current suspended particles of dust and, at the same time, takes full advantage of the drying power of the air or gas before it leaves the chamber. Remaining dust particles are removed in the dust separator 12.

In the alternative arrangement of Figure 2 such material as may pass around the propellers is continuously blown back into suspension at the "wet" end of the drying chamber and is re-circulated therethrough.

The drying air or gas may be heated as desired but in the treatment of hydrous sodium sulphate the temperature should not exceed 33° C. since, otherwise, the material would tend to go into solution in its water of crystallization. It will be observed that the baffles, being staggered as they are, vary the flow of the drying current, prolonging the period of contact with the material. The material itself travels through the drying current, upwardly and downwardly, a plurality of times, depending on the number of hoppers 5 employed. This, with the length of the chamber, will be determined by the character of the material to be dried, which will govern the length of time the material must remain in suspension in the drying agent and the rate at which the drying current in contact with the material must be changed to insure adequate drying within the chamber.

It will be apparent that the baffles will be constructed of suitable materials to resist impact of the material being dried when granulating or crushing conditions are employed as above described.

I claim:

1. A method of drying granular material, which comprises causing particles of the material to travel in countercurrent to a stream of air in a drying chamber, repeatedly projecting the particles upwardly from the bottom of said chamber directly into the stream of air and directing them forwardly in each successive downward movement.

2. A method of drying granular material in suspension in air or the like, which comprises causing the material to travel in countercurrent to said air in a closed chamber, varying the direction of flow of the air, repeatedly projecting particles of the material upwardly from the bottom of said chamber directly into the air current and forwardly in each successive downward movement, and in discharging the vapor-laden air, causing it to pass through suspended particles of the relatively wet material.

3. Apparatus for drying pulverulent material comprising a chamber, means for directing a drying current of air through said chamber, a plurality of transversely arranged, parallel trough-like hoppers having sloping side walls adjacent the bottom of said chamber, means for feeding said material to one of said hoppers, means in each hopper for projecting the material upwardly into said current of air and means arranged above said hoppers and cooperating with the sloping walls thereof for forwardly directing said material in its successive downward movements.

4. Apparatus as defined in claim 3, wherein said last-named means are arranged to disturb the flow of said drying current and vary its contact with said material.

5. Apparatus as defined in claim 3, including a baffle adjacent the air outlet of said chamber for directing the air into and through the relatively wet suspended particles to remove dust from said air.

V. T. BARTRAM.